United States Patent Office 2,769,791
Patented Nov. 6, 1956

2,769,791

COMPOSITION COMPRISING N-NITROSOPIPERI- DINE AND A COPOLYMER OF ACRYLO- NITRILE

George E. Ham, Decatur, Ala., assignor to The Chemstrand Corporation, Decatur, Ala., a corporation of Delaware No Drawing. Application June 10, 1953, Serial No. 360,828

12 Claims. (Cl. 260—30.2)

This invention relates to a new method of preparing synthetic fibers from copolymers of acrylonitrile. More particularly the invention relates to a new solvent for acrylonitrile polymers, and to completely miscible mixtures including acrylonitrile copolymers, from which mixtures quality fibers can be extruded.

It is well known that copolymers of over 75 percent acrylonitrile are capable of being fabricated into high strength fibers. The conventional technique for preparing fibers from these copolymers involves the dissolution of the copolymer in a suitable solvent and thereafter extruding the viscous solution so prepared through an orifice into a medium which removes the solvent and precipitates the acrylonitrile copolymer in a continuous form. Many solvents have been proposed but many of them are impracticable due to the cost and due to the tendency of the solution to gel upon standing, especially at elevated temperatures encountered in the spinning operation.

The primary purpose of this invention is to provide a new low cost solvent for the preparation of synthetic fibers. A further purpose of this invention is to provide a solvent which forms more stable mixtures or solutions of acrylonitrile copolymers. A still further purpose of the invention is to provide a method of forming fibers of high tensile strength and desirable elongation.

It has been found that N-nitrosopiperidine is an excellent solvent for copolymers of 70 to 98 percent by weight of acrylonitrile and from 2 to 30 percent of other polymerizable monomers, for example vinyl acetate and other vinyl esters of monocarboxylic acids, methyl methacrylate and other alkyl esters of methacrylic acid, ethyl acrylate and other alkyl esters of acrylic acid, methacrylonitrile, vinylidene chloride, ethyl maleate and other alkyl esters of maleic acid, ethyl fumarate and other alkyl esters of fumaric acid, styrene and other vinyl substituted aromatic compounds, α-methyl styrene and other isopropenyl aromatic hydrocarbons, vinyl chloride and other vinyl halides, vinyl pyridine and other vinyl substituted heterocyclic amines, and other polymerizable monomers capable of copolymerization with acrylonitrile. N-nitrosopiperidine is also a solvent for copolymers of 70 to 98 percent by weight of acrylonitrile and a plurality of other monomers, for example the copolymers of acrylonitrile, methacrylonitrile and vinyl acetate.

In the practice of this invention, as it is in the preparation of all acrylonitrile fibers, the molecular weight of the polymer is of critical importance. The polymer should have a molecular weight in excess of 10,000, and preferably in excess of 25,000. These molecular weights are determined by measuring the viscosity of the polymer when dissolved in a suitable solvent, such as dimethylformamide, in the manner well known to the art. It is also very desirable to use acrylonitrile copolymers which are substantially uniform throughout with respect to the chemical composition and physical structure. Such uniform copolymers enable the practice of the invention more economically, permitting the utilization of continuous uninterrupted spinning and greatly minimizing fiber fractures and clogging of the spinnerets.

In the practice of this invention the polymers of acrylonitrile are used in finely divided form. Although massive polymers may be ground to desired particle size, preferably solvent-non-solvent polymerization procedures are employed in the preparation of the polymer. The subdivided states of the polymer obtained by spray drying the emulsions, or by filtration and subsequent drying of the solid polymers enable them to be used directly. The finely divided polymer is mixed with N-nitrosopiperidine in any type of mixing device, such as a dough mixer or a homogenizer. It is desirable to use a solution of as high a concentration of the polymer as possible, but the maximum concentration is dependent upon the molecular weight of the polymer.

To obtain fibers of optimum physical properties polymers of molecular weights in excess of 25,000 are used, and when using such polymers it is only possible to dissolve from five to 35 percent in the N-nitrosopiperidine without exceeding practicable viscosity values. Although as low as five percent of the polymer can be used in spinning operations, such concentrations are undesirable because they necessitate the removal and recovery of too much solvent from the extruded solution, thereby increasing solvent recovery cost and reducing spinning speeds by reason of the longer periods required for coagulation. The concentration of the polymer in the solution is preferably between seven and 25 percent but will ultimately be determined by considering the desired physical properties of the fiber and the speed of spinning, which speed is a function of the concentration and viscosity of the polymer solution. The viscosity will depend upon the chemical composition and the molecular weight of the polymers. The optimum proportions can best be determined by selecting a uniform molecular weight polymer having good fiber forming properties and dissolving it in the smallest amount of the N-nitrosopiperidine necessary to form a viscous solution capable of extrusion at convenient temperatures.

The fibers are spun by extruding the N-nitrosopiperidine solution of the acrylonitrile polymer through an orifice, or a spinneret having a plurality of orifices, into a medium which removes the solvent. The volume of the solution passed through the spinneret per unit of time must be constant in order to produce a fiber of uniform size. This is best achieved by using a positively driven gear pump constructed of corrosion resistant metals, such as stainless steel, and adapted to deliver a constant flow of solution regardless of minor changes in viscosity and regardless of the resistance offered by the spinneret. It is also desirable to pass the solution through one or more filters before reaching the spinneret in order to remove all possible traces of foreign matter and particles of incompletely dissolved polymer. The polymer solution may be delivered to the gear pump by means of pressure applied by an inert gas to the liquid surface of the solution reservoir, which must be heated to maintain the solution fluid enough to pass through the conduits. The gear pump, filter devices and conduits to the spinneret are preferably heat insulated and may be heated to maintain the body of solution in liquid state. The extruding operation should be conducted at elevated temperatures, but far enough below the boiling point of the solvent to prevent bubbles or other irregularities in the fiber.

The medium into which the solution is extruded and which removes the solvent may be either liquid or gaseous. The method involving the use of liquids is known as "wet spinning" and usually utilizes aqueous media, which may have salts or other water soluble compounds dissolved therein. The spin bath may be any liquid which is a non-solvent for the acrylonitrile polymer, but which either dissolves the N-nitrosopiperidine, or converts it into soluble compounds. The solvent is leached out of the stream of polymer solution, which first becomes a viscous stream and finally a solid filament. When a spinneret with a plurality of apertures is used the several streams of polymer converge and ultimately form a single fiber. The spin bath must necessarily be of sufficient size to permit the complete, or substantially complete, removal of the N-nitrosopiperidine. Obviously the rapidity of extrusion will affect the size of the spin bath, high speeds requiring much longer baths. The temperature of the bath also affects the size, higher temperatures permitting more rapid diffusion of the N-nitrosopiperidine from the fiber and enabling the use of shorter baths.

The wet spinning method of fiber preparation is particularly adaptable to the use of N-nitrosopiperidine as the polymer solvent. Because of the slower rate of solution of N-nitrosopiperidine in water as compared to the rate of solution of other known solvents, for example N,N-dimethylformamide and N,N-dimethylacetamide, it is possible to obtain clear, transparent fibers, whereas, the fibers prepared from solutions in conventional solvents on precipitation in water, are cloudy or opaque. For this reason it is frequently desirable to use longer precipitation baths or spinning baths adapted to provide longer immersion periods.

The use of N-nitrosopiperidine as a solvent for acrylonitrile copolymers is also adapted to "dry spinning" operations, wherein air, steam, nitrogen or other gas, or mixtures of gases which are inert at the spin temperature, are used to remove the solvent. This method operates at higher temperature; and the N-nitrosopiperidine is evaporated from the surface of the fiber. The maximum temperature to which the fibers can be subjected is approximately the boiling point of the N-nitrosopiperidine, since evaporation within the body of the fiber may cause bubbles or other defects. The fiber may be heated by convection from the hot gaseous medium or by radiation from the walls of the spinning cell. Generally a combination of both convection and radiation is involved, but methods involving principally radiation are generally more efficient and permit the operation with the wall temperature considerably in excess of the boiling point of the N-nitrosopiperidine. The evaporation of the N-nitrosopiperidine from the fiber surface and the speed of the fiber prevent the development of a temperature exceeding that to which the fiber is stable to decomposition. The dry spinning method is particularly useful at high rates of extrusion.

In general the methods of both wet and dry spinning commercially used are adaptable for spinning from N-nitrosopiperidine solutions, but special considerations may be involved due to the different chemical nature of N-nitrosopiperidine. Automatic machinery for spinning continuously, drying the thread if necessary, and winding it on suitable spools may be modified with the teaching of this specification. As in the case of most synthetic fibers, the fibers of acrylonitrile copolymers spun from N-nitrosopiperidine solutions may be stretched to develop optimum physical properties. If desired part of the necessary stretching may be accomplished in the spinning medium by drawing the fiber out of the bath at a rate more rapid than the rate of extrusion.

Further details of the invention are set forth with respect to the following examples.

Example I

A copolymer of 84 parts by weight of acrylonitrile and 16 parts of methacrylonitrile was prepared and dispersed in ten parts by weight of N-nitrosopiperidine. The dispersion was then heated to slightly above 100° C., and a clear solution was obtained which was capable of forming fibers when extruded through a spinneret into a coagulating bath.

Example II

A copolymer of 85 percent by weight of acrylonitrile and 15 percent vinyl acetate was prepared by polymerization in an aqueous medium. The polymer was dispersed in nine parts of N-nitrosopiperidine and heated to approximately 100° C. A transparent solution was thereby obtained.

I claim:

1. A new composition of matter, comprising a homogeneous miscible mixture of N-nitrosopiperidine and a copolymer of from 70 to 98 percent by weight of acrylonitrile and from 2 to 30 percent of another copolymerizable monomer.

2. A new composition of matter, comprising a homogeneous miscible mixture of N-nitrosopiperidine and a copolymer of from 70 to 98 percent by weight of acrylonitrile and from 2 to 30 percent of methacrylonitrile.

3. A new composition of matter, comprising a homogeneous miscible mixture of N-nitrosopiperidine and a copolymer of from 70 to 98 percent by weight of acrylonitrile and from to 2 to 30 percent of vinyl acetate.

4. A new composition of matter, comprising a homogeneous miscible mixture of N-nitrosopiperidine and a copolymer of from 70 to 98 percent by weight of acrylonitrile and from 2 to 30 percent of a vinylpyridine.

5. A new composition of matter, comprising a homogeneous miscible mixture of N-nitrosopiperidine and a copolymer of from 70 to 98 percent by weight of acrylonitrile and from 2 to 30 percent of methyl methacrylate.

6. A new composition of matter, comprising a homogeneous miscible mixture of N-nitrosopiperidine and a copolymer of from 70 to 98 percent by weight of acrylonitrile and from 2 to 30 percent of vinyl chloride.

7. A new composition of matter, comprising a homogeneous miscible mixture of 65 to 95 percent by weight of N-nitrosopiperidine and from five to 35 percent of a copolymer of from 70 to 98 percent by weight of acrylonitrile and from two to 30 percent of another copolymerizable monomer.

8. A new composition of matter, comprising a homogeneous miscible mixture of 65 to 95 percent by weight of N-nitrosopiperidine and from five to 35 percent of a copolymer of from 70 to 98 percent by weight of acrylonitrile and from two to 30 percent of methacrylonitrile.

9. A new composition of matter, comprising a homogeneous miscible mixture of 65 to 95 percent by weight of N-nitrosopiperidine and from five to 35 percent of a copolymer of from 70 to 98 percent by weight of acrylonitrile and from two to 30 percent of vinyl acetate.

10. A new composition of matter, comprising a homogeneous miscible mixture of 65 to 95 percent by weight of N-nitrosopiperidine and from five to 35 percent of a copolymer of from 70 to 98 percent by weight of acrylonitrile and from two to 30 percent of a vinylpyridine.

11. A new composition of matter, comprising a homogeneous miscible mixture of 65 to 95 percent by weight of N-nitrosopiperidine and from five to 35 percent of a copolymer of from 70 to 98 percent of weight of acrylonitrile and from two to 30 percent of methyl methacrylate.

12. A new composition of matter, comprising a homogeneous miscible mixture of 65 to 95 percent by weight of N-nitrosopiperidine and from five to 35 percent of a copolymer of from 70 to 98 percent by weight of acrylonitrile and from two to 30 percent of vinyl chloride.

References Cited in the file of this patent

UNITED STATES PATENTS 2,697,698     Kowolek et al. _____ Dec. 21, 1954

FOREIGN PATENTS 950,695     France _____ Apr. 23, 1945